(12) United States Patent
Giffen et al.

(10) Patent No.: US 7,674,021 B2
(45) Date of Patent: Mar. 9, 2010

(54) APPARATUS FOR REDUCING FLASHBACK PRODUCED BY AN ANTI-COLLISION LIGHT

(75) Inventors: Craig E. Giffen, Hilliard, OH (US);
Lawrence M. Rice, Urbana, OH (US);
Jeffrey M. Singer, Springfield, OH (US)

(73) Assignee: Honeywell International Inc., Morristown, NJ (US)

( * ) Notice: Subject to any disclaimer, the term of this patent is extended or adjusted under 35 U.S.C. 154(b) by 128 days.

(21) Appl. No.: 11/963,439

(22) Filed: Dec. 21, 2007

(65) Prior Publication Data
US 2009/0161376 A1  Jun. 25, 2009

(51) Int. Cl.
*F21V 11/02* (2006.01)
(52) U.S. Cl. .................. 362/470; 362/290; 362/354
(58) Field of Classification Search .............. 362/235, 362/249.01, 290–292, 342, 354, 470–472, 362/509, 540, 542; 340/961, 981–983
See application file for complete search history.

(56) References Cited

U.S. PATENT DOCUMENTS

| | | | | | |
|---|---|---|---|---|---|
| 4,527,158 | A | * | 7/1985 | Runnels | 340/961 |
| 4,558,401 | A | * | 12/1985 | Tysoe | 362/290 |
| 4,807,094 | A | * | 2/1989 | Mateos et al. | 362/510 |
| 6,984,061 | B1 | * | 1/2006 | Soderberg et al. | 362/470 |

* cited by examiner

*Primary Examiner*—Thomas M Sember
(74) *Attorney, Agent, or Firm*—Black Lowe & Graham PLLC

(57) ABSTRACT

A lighting assembly apparatus for wingtip position lights and an anti-collision light (ACL). The lighting assembly apparatus reduces light flashback caused by the ACL by including one or more internal baffles located inside of a lens. A lens retainer receives the lens. The lens retainer includes a base section and internal baffles. The one or more internal baffles include a crossbeam baffle that is attached between upper and lower surfaces of the lens retainer. The crossbeam baffle reduces light flashback caused by the ACL and complies with ACL/regulatory requirements. The internal baffle includes a stepped edge that also reduces light flashback caused by the ACL and complies with ACL requirements.

8 Claims, 3 Drawing Sheets

APPARATUS FOR REDUCING FLASHBACK PRODUCED BY AN ANTI-COLLISION LIGHT

BACKGROUND OF THE INVENTION

Often the pulse or flash of an anti-collision light (ACL) on the wingtip of an aircraft will "flash back" into the cockpit. This becomes an annoyance to the flight crew and can reduce their night vision capabilities. Prior methods of reducing flashback have included painting some areas of the inside of the lens that covers the ACL with black paint or an alternate light absorbing material. This paint would have a shape such that the ACL would meet the Federal Aviation Requirements, yet block any unnecessary light from the pulse of the ACL. Painting adds costs and man hours to wingtip light installation. In addition to painting the lens to reduce flashback, baffles external to the ACL assembly have been used to reduce flashback. These baffles add drag to the aircraft.

SUMMARY OF THE INVENTION

The present invention provides a lighting assembly apparatus for wingtip position lights and an anti-collision light (ACL). The lighting assembly apparatus reduces light flashback caused by the ACL by including one or more internal baffles located inside of a lens. A lens retainer receives the lens. The lens retainer includes a base section and internal baffles.

In one aspect of the present invention, the one or more internal baffles include a crossbeam baffle that is attached between upper and lower surfaces of the lens retainer. The crossbeam baffle reduces light flashback caused by the ACL and complies with ACL/regulatory requirements.

In another aspect of the present invention, the internal baffle includes a stepped edge that also reduces light flashback caused by the ACL and complies with ACL requirements.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

Figure 1:
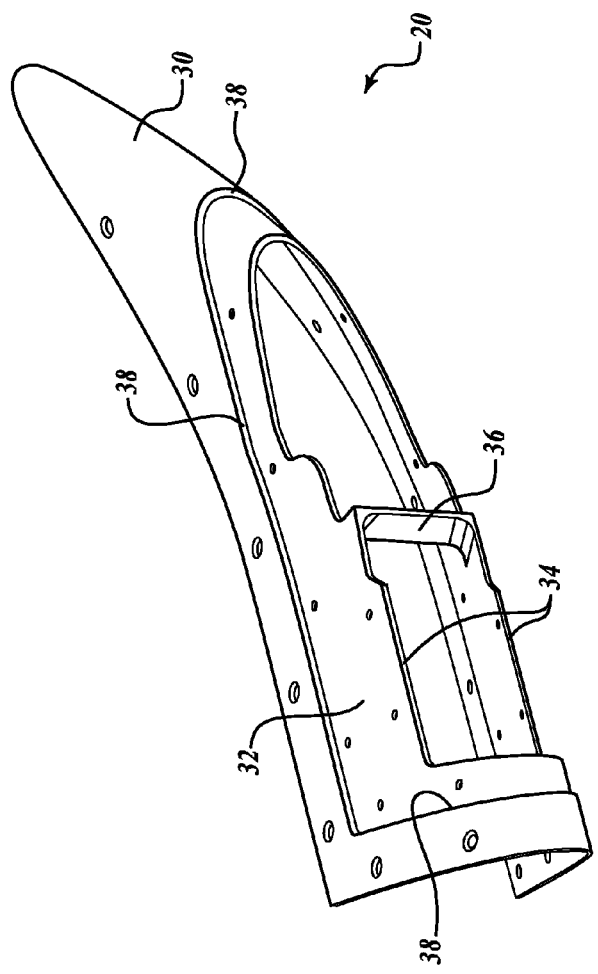
FIG. 1 illustrates a perspective view of a lens retainer formed in accordance with the embodiment of the present invention.

FIG. 1 illustrates a lens retainer 20 formed/machined in accordance with an embodiment of the present invention. The lens retainer 20 secures a protective lens and baffles the anti-collision light (ACL) to reduce flashback to pilots while allowing the ACL and possibly position lights to provide lighting in compliance with Federal Aviation Regulation (FAR).

In one embodiment, the lens retainer 20 includes a base exterior section 30, an internal baffle 32, and an internal cross-beam baffle 36. The parts of the lens retainer 20 may be separately manufactured and then assembled together using various techniques such as bonding agents or fasteners or the lens retainer 20 may be formed of a monolithic material produced from a mold.

The lens retainer 20 may be machined from any of a number of different types of materials, such as various types of aluminum, such as aluminum 6061, or aluminum 5083 or other materials such as plastic. The lens retainer 20 is polished and/or painted according to known techniques and aviation requirements.

The internal baffle 32 extends from a first edge approximately parallel to the base exterior section 30 but is recessed inward from the surface of the base exterior section 30. This produces a step 38 that is located between the internal baffle 32 and the base section 30. The step 38 is designed to receive a lens (not shown).

A second edge 34 the internal baffle 32 is a stepped edge based on the location of the ACL relative to the cockpit for providing flashback protection. The second edge 34 begins at a first distance away from the step 38 at an outboard end of the lens retainer 20 and steps away from the step 38 one or more times at or near a location proximate to an X-axis location of an ACL (not shown) when the lens retainer 20 is mounted on to the wingtip of an aircraft. The second edge 34 then returns to a closer distance from the step 38 at or near the inboard end of the lens retainer 20. The shape of the step 34 of the internal baffle 32 is determined based on ACL position relative to the aircraft flight crew (cockpit) when the ACL is mounted on the wingtip.

The internal crossbeam baffle 36 is attached between a top side of the second edge 34 and a bottom side of the second edge 34. The X-axis position for the internal crossbeam baffle 36 is inboard from the ACL. The size of the internal crossbeam baffle 36 is determined based on the relative position of the ACL to the flight crew (cockpit).

The internal baffle 32 may include holes 40 for receiving attachment devices, screws or rivets, for attaching the lens to the lens retainer 20. The base exterior section 30 includes holes 42 for attaching the lens retainer 20 to support and structure at the wingtip of the aircraft.

Figure 2:
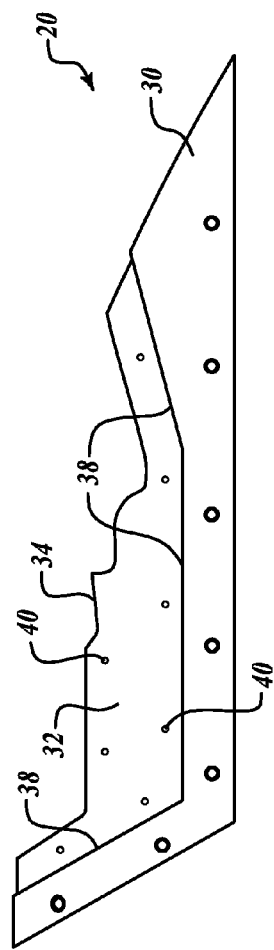
FIG. 2 illustrates a plan view of the example lens retainer shown in FIG. 1.
Figure 3:
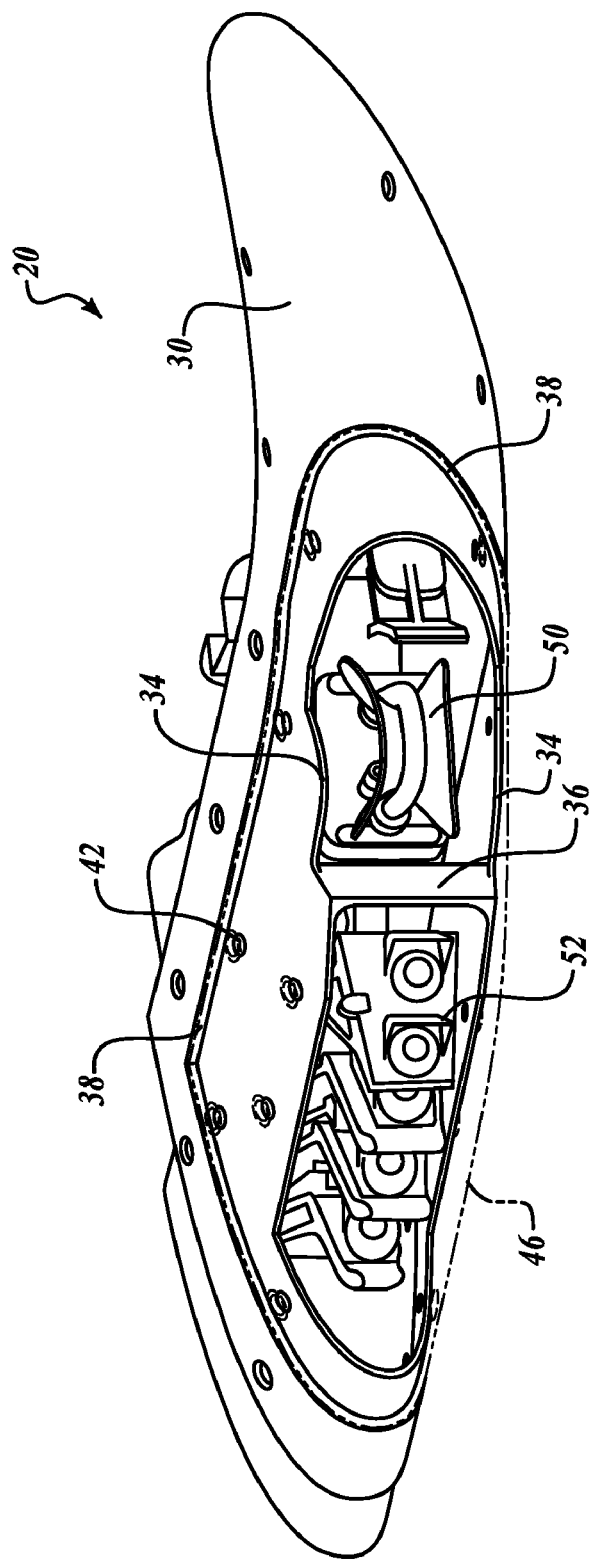
FIGS. 3 and 4 illustrate perspective views of a wingtip lighting assembly unit with a lens and lens retainer formed in accordance with an embodiment of the present invention.

FIG. 3 illustrates the lens retainer 20 of FIGS. 1 and 2 mounted over an ACL 50 and position lights 52. A lens 46 is also shown attached to the internal baffle 32. The lens 46 may be formed of any of a number of aviation-approved materials, such as glass or injection-molded materials, such as a polycarbonate, e.g. GE Lexan LS2. The lens 46 is attached to the internal baffle 32 using standard techniques such as screws applied through bushings and held in place by locking nuts. In other embodiments an adhesive with rivets installed through aluminum bushings or other attachment mechanism may be used.

Figure 4:
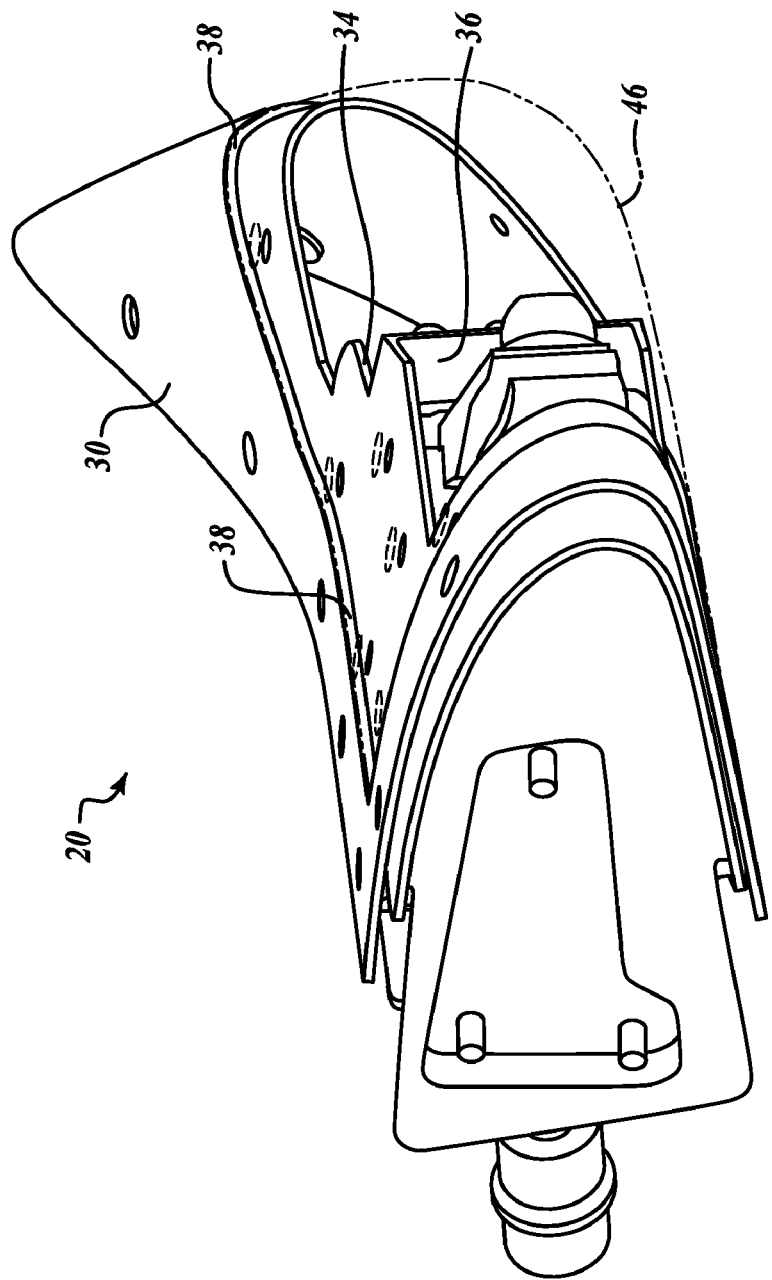

FIG. 4 illustrates an approximate zoomed view that a pilot might see looking at the left wingtip. As shown, the ACL 50 and a reflector device associated with the ACL 50 are not visible because of the internal baffle 32 and the internal crossbeam baffle 36. The lens retainer 20 with internal baffles 32 and 36 reduce flashback caused by the ACL 50 located at the wingtips of the aircraft. In addition the baffles 32 and 36 absorb light reflected from the inside of the lens surfaces and block light from the ACL 50 from reaching the inside surfaces where possible.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A lighting assembly apparatus comprising:
   an anti-collision light (ACL);
   one or more position lights;
   a lens; and
   a lens retainer configured to receive the lens and surround the ACL and the one or more position lights, the lens retainer comprising:
     one or more internal baffles configured to reduce flashback caused by the ACL when the apparatus is mounted on an aircraft wing, the one or more internal baffles comprise only one crossbeam baffle that is attached between upper and lower surfaces of the lens retainer, the crossbeam baffle being configured to reduce light flashback caused by the ACL and to comply with ACL requirements,
     wherein the internal baffles being located on a concave side of the lens.

2. The apparatus of claim 1, wherein the internal baffle includes a stepped edge configured to reduce light flashback caused by the ACL and to comply with ACL requirements, wherein the stepped edge is contiguous edge and has a circumferal relationship to the ACL and position lights.

3. The apparatus of claim 1, wherein the lens retainer comprises a base section configured to attach to an aircraft wingtip.

4. The apparatus of claim 3, wherein the lens retainer is machined from a monolithic material.

5. The apparatus of claim 4, wherein the material is Aluminum.

6. The apparatus of claim 3, wherein the base section and internal baffle are separate parts.

7. The apparatus of claim 1, further comprising attaching devices configured to attach the lens to one of the internal baffles.

8. An aircraft wing lighting assembly comprising:
   an anti-collision light (ACL);
   one or more position lights;
   a lens; and
   a lens retainer configured to receive the lens and surround the ACL and the one or more position lights, the lens retainer comprising:
     one or more internal baffles configured to reduce flashback caused by the ACL when the assembly is mounted on an aircraft wing,
     wherein the internal baffles being located on a concave side of the lens,
     wherein the one or more internal baffles comprise a single crossbeam baffle that is attached between upper and lower surfaces of the lens retainer, the crossbeam baffle being located between upper and lower sections, the ACL is located in the upper section and the one or more position lights are located in the lower section.

* * * * *